(12) United States Patent
Yoshida

(10) Patent No.: US 10,291,819 B2
(45) Date of Patent: May 14, 2019

(54) IMAGE READING DEVICE WITH NOISE REMOVAL WHEN COVER IS OPEN

(71) Applicant: KYOCERA Document Solutions Inc., Osaka-shi, Osaka (JP)

(72) Inventor: Masaya Yoshida, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/562,157

(22) PCT Filed: Mar. 25, 2016

(86) PCT No.: PCT/JP2016/059538
§ 371 (c)(1),
(2) Date: Sep. 27, 2017

(87) PCT Pub. No.: WO2016/158713
PCT Pub. Date: Oct. 6, 2016

(65) Prior Publication Data
US 2018/0084152 A1 Mar. 22, 2018

(30) Foreign Application Priority Data

Mar. 31, 2015 (JP) ................. 2015-071033

(51) Int. Cl.
*H04N 1/00* (2006.01)
*H04N 1/04* (2006.01)
(Continued)

(52) U.S. Cl.
CPC ....... *H04N 1/4097* (2013.01); *H04N 1/00835* (2013.01); *H04N 1/02815* (2013.01);
(Continued)

(58) Field of Classification Search
CPC ............. H04N 1/4097; H04N 1/02815; H04N 1/00835; H04N 1/04; H04N 1/107; H04N 1/10
See application file for complete search history.

(56) References Cited

U.S. PATENT DOCUMENTS

2010/0328727 A1* 12/2010 Ohara ................. H04N 1/3873
358/3.01
2013/0100504 A1* 4/2013 Suwa ....................... G06K 9/20
358/474

FOREIGN PATENT DOCUMENTS

JP          09135330 A  *  5/1997
JP          2013110506 A    6/2013
JP          2013115499 A    6/2013

* cited by examiner

*Primary Examiner* — Christopher Wait
(74) *Attorney, Agent, or Firm* — Alleman Hall Creasman & Tuttle LLP

(57) ABSTRACT

An image reading device (1) includes a light emission control portion (84), an image scanning portion (11), and a difference data sequence generating portion (852, 853, 855). The difference data sequence generating portion (852, 853, 855) sequentially obtains image data sequences of a linear area both when a light emitting portion is in a light-on state and when the light emitting portion is in a light-off state. In addition, the difference data sequence generating portion (852, 853, 855) sequentially generates difference data sequences (Ys) that are results of subtracting an image data sequence (X2) obtained in a light-off state of the light emitting portion from an image data sequence (X1) obtained in a light-on state of the light emitting portion, among a pair of image data sequences (X1, X2) obtained at each blinking cycle of the light emitting portion.

5 Claims, 7 Drawing Sheets

(51) Int. Cl.
 *H04N 1/10* (2006.01)
 *H04N 1/028* (2006.01)
 *H04N 1/107* (2006.01)
 *H04N 1/387* (2006.01)
 *H04N 1/407* (2006.01)
 *H04N 1/409* (2006.01)
(52) U.S. Cl.
 CPC ................ *H04N 1/04* (2013.01); *H04N 1/10* (2013.01); *H04N 1/107* (2013.01); *H04N 1/3873* (2013.01); *H04N 1/4072* (2013.01)

IMAGE READING DEVICE WITH NOISE REMOVAL WHEN COVER IS OPEN

TECHNICAL FIELD

The present invention relates to an image reading device, an image processing apparatus including the same, and an image reading method.

BACKGROUND ART

In general, an image reading device includes an image scanning portion configured to scan a document sheet placed on a transparent document sheet table while detecting an amount of light emitted from the document sheet. The image scanning portion includes a light emitting portion configured to emit light toward the document sheet; and an image sensor configured to receive light reflected from a linear area of the document sheet that extends along a main scanning direction, and the image scanning portion scans the document sheet along a sub scanning direction. The image sensor outputs a data sequence representing amounts of light detected with respect to pixels of the linear area of the document sheet. It is noted that the sub scanning direction is perpendicular to the main scanning direction.

Image data for a secondary image of the document sheet is obtained by combining, along the sub scanning direction, data sequences representing image densities of the linear areas obtained through the image scanning portion. In addition, an image processing apparatus such as a copier includes an image reading portion and an image forming portion. The image forming portion of the copier forms the secondary image on a recording sheet by forming, sequentially on the recording sheet, linear images based on the data sequences representing image densities of the linear areas obtained through the image scanning portion.

In addition, there is known a technique where normal image density data and comparison image density data are compared, and an area including pixels that differ greatly in density is identified as a document sheet area, wherein the normal image density data is obtained when the light emitting portion is set to emit a normal amount of light, and the comparison image density data is obtained when the light emitting portion is set to emit a different amount of light (see, for example, PTL-1).

CITATION LIST

Patent Literature

[PTL 1] Japanese Patent Application Publication No. 2013-110506

SUMMARY OF THE INVENTION

Problems to be Solved by the Invention

Meanwhile, there is a case where, in the image reading device, the image scanning portion performs scanning of the document sheet in a state where the document sheet table cover is opened. In this case, a noise image is apt to appear in an outside-document-sheet area, wherein the noise image is caused when external light such as indoor illumination light enters the image sensor.

To remove the noise image from the outside-document-sheet area, the document sheet area may be identified from image density data. To identify the document sheet area from the image density data, it is necessary to perform, for each of the linear areas extending along the main scanning direction, an image process having a relatively high calculation load, such as an edge detection process of detecting a boundary position between the document sheet area and the outside-document-sheet area.

However, a simpler process is desired to avoid the phenomenon where the noise image appears in the outside-document-sheet area due to the external light.

The present invention has been made in view of such conventional circumstances, and it is an object of the present invention to provide an image reading device, an image processing apparatus, and an image reading method that, in a case where scanning of the document sheet is performed in a state where the document sheet table cover is opened, can, with a simpler process, avoid the phenomenon where the noise image appears in the outside-document-sheet area due to the external light.

Solution to the Problems

An image reading device according to an aspect of the present invention includes a light emission control portion, an image scanning portion, and a difference data sequence generating portion. The light emission control portion causes a light emitting portion to blink, wherein the light emitting portion emits light toward a document sheet placed on a transparent document sheet table. The image scanning portion, both when the light emitting portion is in a light-on state and when the light emitting portion is in a light-off state, scans the document sheet along a sub scanning direction while detecting, for each pixel, an amount of light emitted from a linear area of a document sheet table that extends along a main scanning direction, the sub scanning direction being perpendicular to the main scanning direction. The difference data sequence generating portion sequentially obtains, through the image scanning portion, image data sequences each of which represents amounts of light detected with respect to pixels of the linear area. In addition, the difference data sequence generating portion sequentially generates difference data sequences that are results of subtracting a light-off-time image data sequence from a light-on-time image data sequence among a pair of image data sequences obtained at each blinking cycle of the light emitting portion.

An image processing apparatus according to another aspect of the present invention includes the image reading device according to the aspect of the present invention, and the image forming device. The image forming device forms an image on a recording sheet based on the difference data sequences sequentially generated by the image reading device.

An image reading method according to an aspect of the present invention includes the following three steps. One of the three steps causes a light emitting portion to blink, the light emitting portion emitting light toward a document sheet placed on a transparent document sheet table. Another one of the three steps, both when the light emitting portion is in a light-on state and when the light emitting portion is in a light-off state, scans the document sheet along a sub scanning direction while detecting, for each pixel, an amount of light emitted from a linear area of a document sheet table that extends along a main scanning direction, the sub scanning direction being perpendicular to the main scanning direction. A further one of the three steps sequentially obtains, through the step of scanning the document sheet, image data sequences each of which represents amounts of light detected with respect to pixels of the linear area, and sequentially generates difference data sequences that are results of subtracting a light-off-time image data sequence from a light-on-time image data sequence among a pair of image data sequences obtained at each blinking cycle of the light emitting portion.

Advantageous Effects of the Invention

According to the present invention, it is possible to provide an image reading device, an image processing apparatus, and an image reading method that, in a case where scanning of the document sheet is performed in a state where the document sheet table cover is opened, can, with a simpler process, avoid the phenomenon where the noise image appears in the outside-document-sheet area due to the external light.

DESCRIPTION OF EMBODIMENTS

The following describes embodiments of the present invention with reference to the accompanying drawings for the understanding of the invention. It should be noted that the following embodiments are an example of a specific embodiment of the present invention and should not limit the technical scope of the present invention.

First Embodiment

Figure 1:
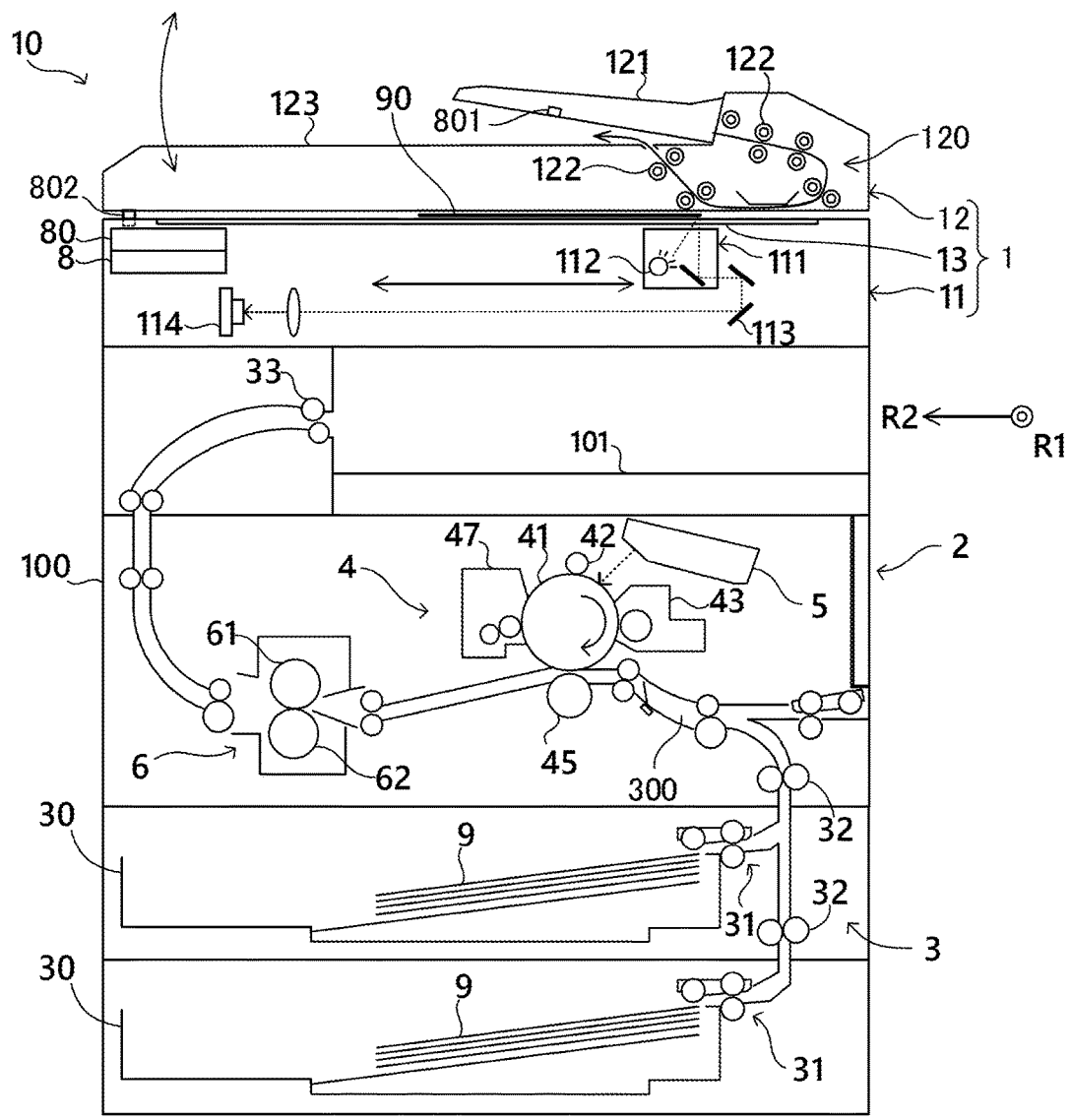
FIG. 1 is a configuration diagram of an image processing apparatus according to a first embodiment of the present invention.
Figure 2:
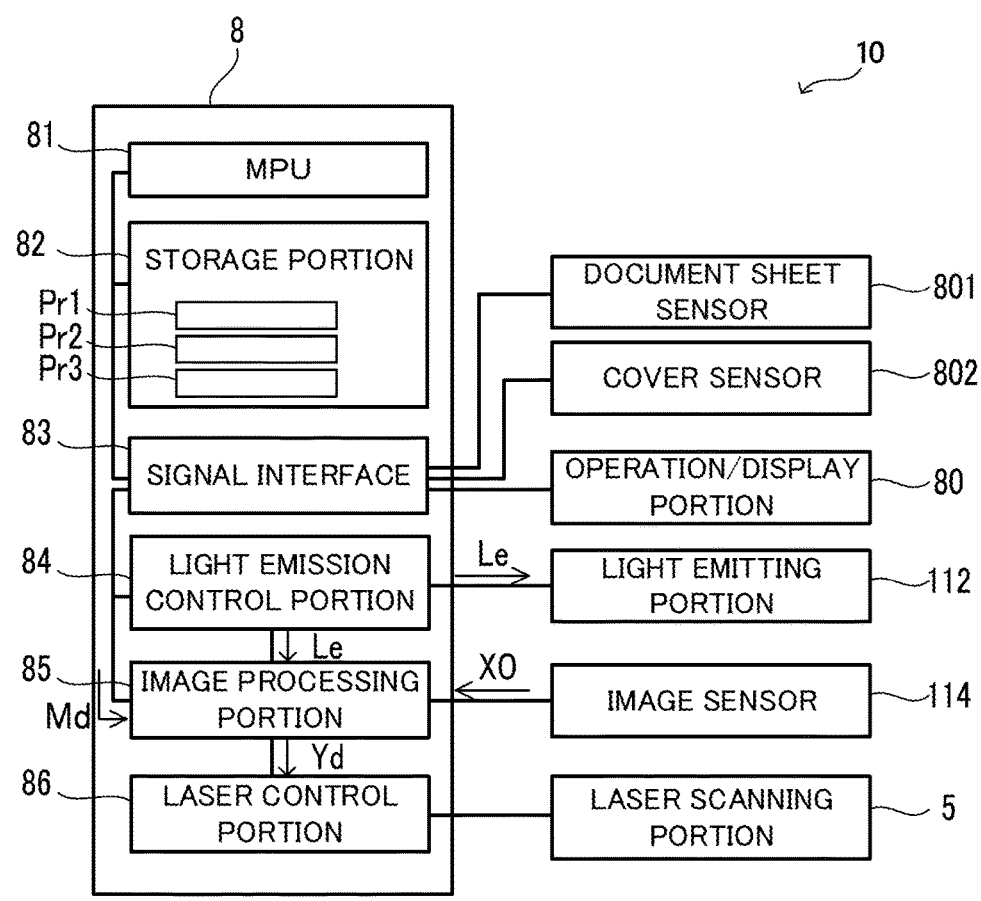
FIG. 2 is a block diagram of image-processing-related equipment included in the image processing apparatus according to the first embodiment of the present invention.

First, a description is given of a configuration of an image processing apparatus 10 according to a first embodiment, with reference to FIG. 1 and FIG. 2. The image processing apparatus 10 includes an image reading device 1 and an image forming device 2. Furthermore, the image processing apparatus 10 includes an information processing portion 8 and an operation/display portion 80 that are shared by the image reading device 1 and the image forming device 2.

For example, the image processing apparatus 10 is a copier; a printer or a facsimile having a function of a copier; or a multifunction peripheral having a plurality of image processing functions including an image reading function.

As shown in FIG. 1, the image reading device 1 includes a transparent document sheet table 13, an image scanning portion 11, and a document sheet table cover 12. An ADF (Auto Document Feeder) 120 is built in the document sheet table cover 12.

On the document sheet table 13, a document sheet 90 that is an image reading target is placed. In general, the document sheet table 13 is called platen glass. The document sheet table cover 12 is supported so as to be pivotable with respect to a housing 100 of the image processing apparatus 10 between a closing position for covering the document sheet table 13 and an opening position for exposing the upper surface of the document sheet table 13.

The image scanning portion 11 includes a moving unit 111, an optical system 113, and an image sensor 114, wherein the moving unit 111 includes a light emitting portion 112, and the optical system 113 includes a mirror and a lens. In the following description, one direction in a horizontal plane and a direction perpendicular to the one direction are referred to as a main scanning direction R1 and a sub scanning direction R2, respectively.

The light emitting portion 112 is a light source that emits light toward the document sheet 90 placed on the transparent document sheet table 13. The light emitting portion 112 emits a belt-shaped light beam that extends along the main scanning direction R1, through the document sheet table 13 to the document sheet 90. The light emitting portion 112 may be, for example, a LED array composed of a plurality of light-emitting diodes arrayed along the main scanning direction R1. Alternatively, the light emitting portion 112 may be a straight tubular fluorescent lamp extending along the main scanning direction R1.

The optical system 113 includes a mirror and a lens arranged to guide light emitted from a linear area of the document sheet table 13 that extends along the main scanning direction R1, to a light-receiving portion of the image sensor 114. In a case where the document sheet 90 is placed on the document sheet table 13, the light emitted from the linear area of the document sheet table 13 includes light emitted from the document sheet 90 and light irradiated from an outside-document-sheet area. In a case where the light emitting portion 112 is lighting, the light emitted from the document sheet 90 is light that has been emitted from the light emitting portion 112 and reflected on the document sheet 90.

In a state where the document sheet table cover 12 is closed, the light irradiated from the outside-document-sheet area is light emitted from an inner surface of the document sheet table cover 12. In the state where the document sheet table cover 12 is closed, the inner surface of the document sheet table cover 12 extends along the surface of the document sheet table 13.

In a state where the document sheet table cover 12 is opened, the light irradiated from the outside-document-sheet area is external light that is incident on the document sheet table 13 from above. The external light causes a noise image in the outside-document-sheet area of an image read by the image reading device 1.

The image sensor 114 is a sensor that detects, for each pixel, an amount of light emitted from the linear area of the document sheet table 13 extending along the main scanning direction R1, and outputs data of the detected amounts of light of the pixels, as an image data sequence of the linear area. For example, the image sensor 114 may be a CCD (Charge Coupled Device) 114.

The image sensor 114 outputs image data sequences each of which represents amounts of light detected with respect to pixels of the linear area. The image data sequence includes data of a plurality of pixels that are partitioned areas of the linear area aligned in the main scanning direction R1. In the following description, the image data sequence output from the image sensor 114 is referred to as a primary image data sequence X0.

The moving unit 111 moves along the sub scanning direction R2 while supporting a part of the light emitting portion 112 and the optical system 113. With this movement, a position of the linear area in the sub scanning direction R2 changes, wherein the linear area is a target to which the light emitting portion 112 emits light. Also, an amount of light emitted from the linear area is detected by the image sensor 114.

As the moving unit 111 moves along the sub scanning direction R2, the image scanning portion 11 scans the document sheet 90 along the sub scanning direction R2 while detecting, for each pixel, an amount of light emitted from the linear area of the document sheet table 13 that extends along the main scanning direction R1.

It is noted that a contact image sensor (CIS) in which the light emitting portion 112, the image sensor 114, and the lens are integrally formed, may be adopted as the image scanning portion 11. In this case, the contact image sensor is supported by the moving unit 111.

The ADF 120, with a plurality of rotating conveyance rollers 122, conveys the document sheet 90 set on a document sheet tray 121, to a discharge tray 123 via the image reading position. During the conveyance, the image scanning portion 11 reads an image from the document sheet in a state where the moving unit 111 is in a standstill at the image reading position.

In the example shown in FIG. 1, the image reading device 1 includes a document sheet sensor 801 and a cover sensor 802, as well. The document sheet sensor 801 detects whether or not the document sheet 90 is set on the document sheet tray 121. The cover sensor 802 detects whether or not the document sheet table cover 12 is closed.

The image forming device 2 forms an image on a recording sheet 9 based on the image data sequences output from the image reading device 1. The recording sheet 9 is a sheet-like image formation medium such as a sheet of paper, a sheet of coated paper, a postcard, an envelope, or an OHP sheet.

The image forming device 2 includes, for example, a sheet conveying portion 3, an image forming portion 4, a laser scanning portion 5, and a fixing portion 6. The image forming device 2 shown in FIG. 1 is based on an electrophotographic system. It is noted that the image forming device 2 may be based on another system such as an ink jet system.

In the sheet conveying portion 3, a sheet feeding roller 31 feeds the recording sheet 9 from a sheet storage portion 30 to a sheet conveyance path 300. Furthermore, a sheet conveyance roller 32 conveys the recording sheet 9 along the sheet conveyance path 300. Furthermore, a discharge roller 33 discharges the recording sheet 9 with an image formed thereon, from an outlet port of the sheet conveyance path 300 onto a discharge tray 101.

The image forming portion 4 forms an image on a surface of the recording sheet 9 that is moving along the sheet conveyance path 300. The image forming portion 4 includes a drum-shaped photoconductor 41, a charging portion 42, a developing portion 43, a transfer portion 45, and a cleaning portion 47. It is noted that the photoconductor 41 is an example of the image carrier.

The photoconductor 41 rotates, and the charging portion 42 uniformly charges the surface of the photoconductor 41. Furthermore, the laser scanning portion 5 writes an electrostatic latent image on the surface of the photoconductor 41 by scanning a laser light over the charged surface. Furthermore, the developing portion 43 supplies developer to the photoconductor 41, thereby the electrostatic latent image is developed as an image of the developer. It is noted that the developer is supplied from a developer replenishing portion (not shown) to the developing portion 43.

Furthermore, the transfer portion 45 transfers the image of the developer from the surface of the photoconductor 41 to the recording sheet 9 that is moving along the sheet conveyance path 300. At the end, the cleaning portion 47 removes the developer that has remained on the surface of the photoconductor 41.

The fixing portion 6 causes the recording sheet 9 with an image formed thereon to be nipped between a fixing roller 61 and a pressure roller 62 and carried to the downstream process, wherein a heater such as a halogen heater is embedded in the fixing roller 61. During this process, the fixing portion 6 heats the image of the developer on the recording sheet 9 and fixes the image onto the recording sheet 9.

The information processing portion 8 displays an operation menu or the like on the operation/display portion 80. Furthermore, the information processing portion 8 performs image processing on an image input via the image reading device 1. Furthermore, the information processing portion 8 controls various electric devices included in the image processing apparatus 10 based on: input information that is input via the operation/display portion 80; and detection results of various sensors including a document sheet sensor 801 and a cover sensor 802.

For example, as shown in FIG. 2, the information processing portion 8 includes an MPU (Micro Processor Unit) 81, a storage portion 82, a signal interface 83, a light emission control portion 84, an image processing portion 85, and a laser control portion 86.

The MPU 81 is a processor that executes various calculation processes. The storage portion 82 is a nonvolatile storage portion in which information such as programs Pr1 to Pr3 for causing the MPU 81 to execute various processes, is stored in advance. Furthermore, the MPU 81 can write and read various types of information to/from the storage portion 82.

The MPU 81 executes the various programs Pr1 to Pr3 stored in advance in the storage portion 82 such that the information processing portion 8 comprehensively controls the image processing apparatus 10.

The signal interface 83 is an interface circuit that relays exchange of signals among the MPU 81, sensors, control-target devices and the like. The MPU 81 inputs detection signals (measurement signals) from various sensors such as the document sheet sensor 801 and the cover sensor 802, via the signal interface 83. Furthermore, the MPU 81 outputs control signals to control-target devices via the signal interface 83.

The light emission control portion 84 controls the light emitting portion 112 of the image scanning portion 11 to light on or off the light emitting portion 112. The image processing portion 85 inputs image data obtained through the image scanning portion 11 and executes image processing. The laser control portion 86 inputs a recording image data sequence output from the image processing portion 85, and adjusts the amount of laser light output from the laser scanning portion 5, based on the density of each pixel represented by the recording image data sequence.

Meanwhile, there is a case where, in the image reading device 1, the image scanning portion 11 performs scanning of the document sheet 90 in a state where the document sheet table cover 12 is opened. In this case, a noise image is apt to appear in the outside-document-sheet area, wherein the noise image is caused when external light such as indoor illumination light enters the image sensor 114.

To remove the noise image from the outside-document-sheet area, the document sheet area may be identified from image density data. To identify the document sheet area from the image density data, it is necessary to perform, for each of the linear areas extending along the main scanning direction, an image process having a relatively high calculation load, such as an edge detection process of detecting a boundary position between the document sheet area and the outside-document-sheet area.

However, a simpler process is desired to avoid the phenomenon where the noise image appears in the outside-document-sheet area due to the external light.

The information processing portion 8 of the present embodiment has a configuration for, with a simpler process, avoiding the phenomenon where the noise image appears in the outside-document-sheet area due to the external light.

[Light Emission Control Portion]

The light emission control portion 84 of the present embodiment performs a blink control to cause the light emitting portion 112 to blink while the image scanning portion 11 is scanning the document sheet 90. It is noted that the light emission control portion 84 is an example of the light emission control portion.

In the present embodiment, when an operation mode signal Md output from the MPU 81 indicates an open scanning mode, the light emission control portion 84 performs the blink process in which the light emitting portion 112 blinks at predetermined cycles while the image scanning portion 11 is scanning the document sheet 90. On the other hand, when the operation mode signal Md indicates a closed scanning mode, the light emission control portion 84 keeps the light emitting portion 112 lighting while the image scanning portion 11 is scanning the document sheet 90.

The open scanning mode is an operation mode in which the scanning of the document sheet 90 on the document sheet table 13 is executed on the supposition that the document sheet table cover 12 is opened. The closed scanning mode is an operation mode in which the scanning of the document sheet 90 on the document sheet table 13 is executed on the supposition that the document sheet table cover 12 is closed.

For example, the MPU 81 may execute a first operation mode setting program Pr1 so as to set the operation mode signal Md in accordance with an operation of the user performed on the operation/display portion 80.

In addition, the MPU 81 may automatically set the operation mode signal Md depending on whether or not the detection results of the document sheet sensor 801 and the cover sensor 802 satisfy a predetermined open scanning mode condition. In this case, the MPU 81 automatically sets the operation mode signal Md by executing a second operation mode setting program Pr2.

For example, the open scanning mode condition is that the document sheet sensor 801 has detected a state where no document sheet 90 is set on the document sheet tray 121, and the cover sensor 802 has detected a state where the cover sensor 802 is not closed. When the MPU 81 has detected that a copy execution operation was performed on the operation/display portion 80 in a state where the open scanning mode condition was satisfied, the MPU 81 sets the operation mode signal Md to the open scanning mode, and otherwise, the MPU 81 sets the operation mode signal Md to the closed scanning mode

[Image Processing Portion 85]

Figure 3:
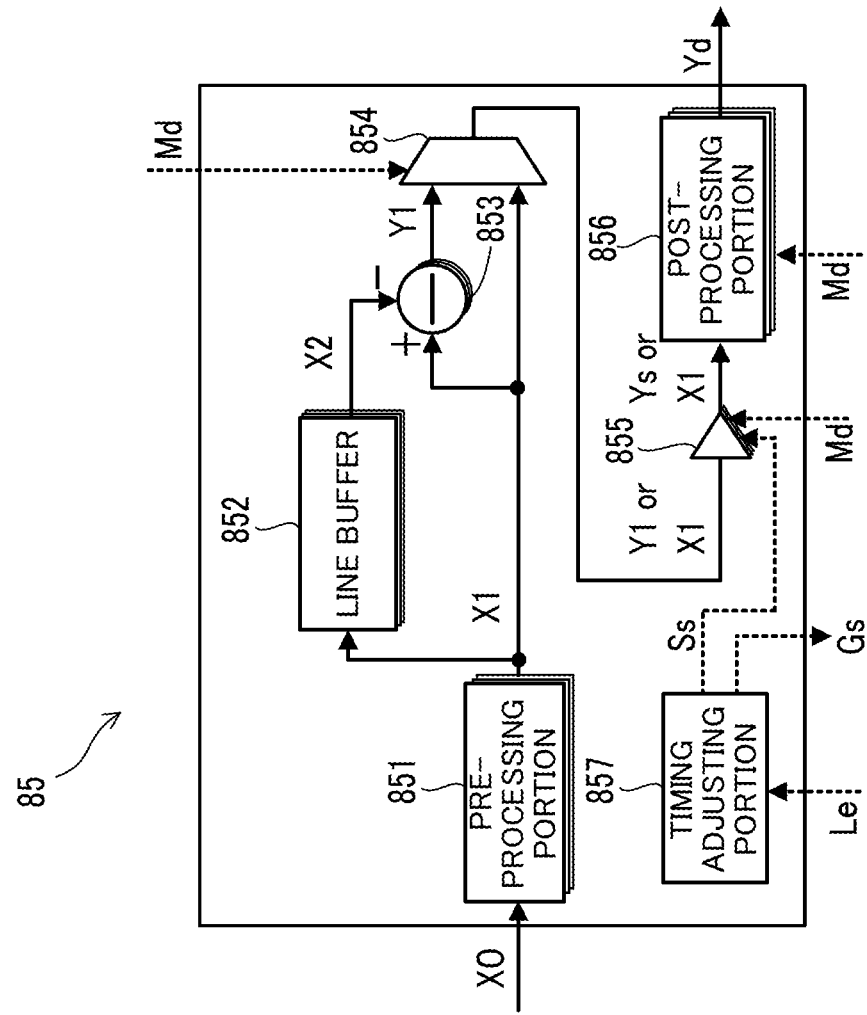
FIG. 3 is a block diagram of an image processing portion included in the image processing apparatus according to the first embodiment of the present invention.
Figure 4:
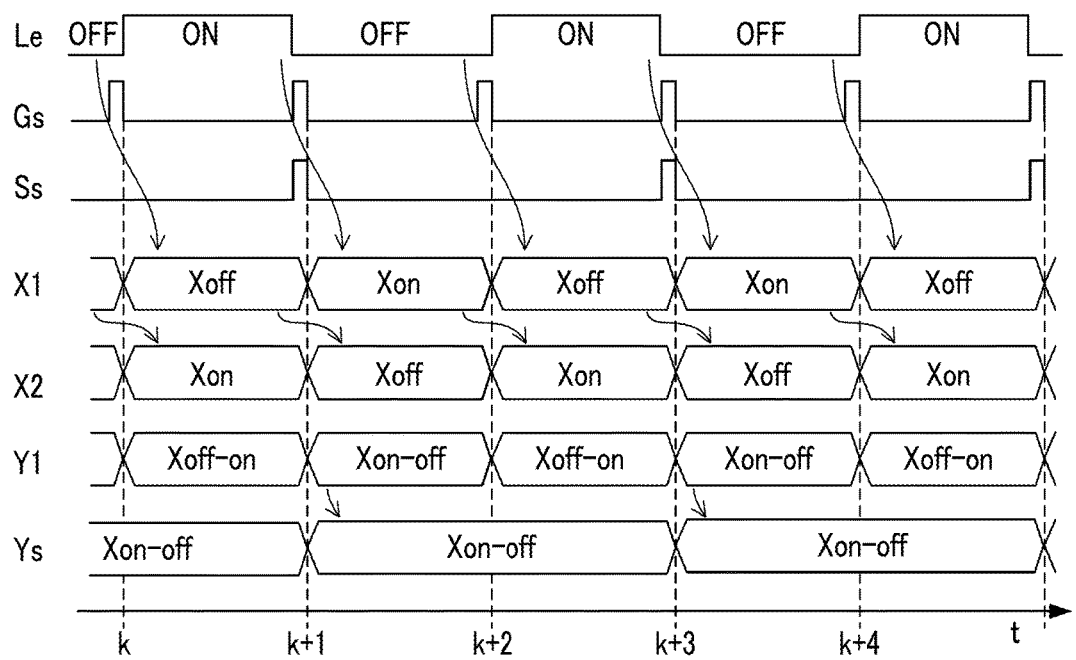
FIG. 4 is a time chart showing a state change of a light emitting portion and a state change of a signal and data of an image processing portion in the image processing apparatus according to the first embodiment of the present invention.

Next, with reference to FIG. 3 and FIG. 4, the image processing portion 85 is described. As shown in FIG. 3, the image processing portion 85 includes a line buffer 852, a subtraction portion 853, a sampling portion 855, and a timing adjusting portion 857. Furthermore, the image processing portion 85 of the present embodiment includes a pre-processing portion 851, a data selecting portion 854, and a post-processing portion 856. For example, the image processing portion 85 may be implemented by an ASIC (Application Specific Integrated Circuit), a DSP (Digital Signal Processor) or the like.

The pre-processing portion 851 performs a known image correction process, such as a shading correction and a gamma correction, on the primary image data sequence X0, and outputs a secondary image data sequence X1 that is an image data sequence after the correction.

The line buffer 852 is a buffer memory that temporarily stores an image data sequence until the next image data sequence is obtained when image data sequences are obtained sequentially through the image scanning portion 11 while it is scanning the document sheet 90. In the present embodiment, the line buffer 852 temporarily stores the secondary image data sequence X1 while the secondary image data sequences X1 are obtained sequentially through the image scanning portion 11 and the pre-processing portion 851.

The subtraction portion 853 sequentially generates subtraction data sequences Y1 each of which is a result of subtracting a predetermined one of the latest secondary image data sequence X1 and the last but one secondary image data sequence X2, from the other, wherein the latest secondary image data sequence X1 is obtained through the image scanning portion 11, and the last but one secondary image data sequence X2 is stored in the line buffer 852. In the present embodiment, the subtraction portion 853 calculates the subtraction data sequence Y1 by subtracting the last but one secondary image data sequence X2 from the latest secondary image data sequence X1.

The image sensor 114 outputs the primary image data sequence X0 each time the light emitting portion 112 switches between the light-on state and the light-off state. More specifically, at a timing when a shift gate signal Gs supplied from the timing adjusting portion 857 changes in state, the image sensor 114 outputs the primary image data sequence X0 that represents amounts of light received immediately before the timing. This allows the primary image data sequence X0 in the light-on state and the primary image data sequence X0 in the light-off state to be output sequentially from the image sensor 114.

The timing adjusting portion 857 generates and outputs, to the image sensor 114, the shift gate signal Gs that causes the image sensor 114 to output the primary image data sequence X0 each time the light emitting portion 112 switches between the light-on state and the light-off state. For example, the timing adjusting portion 857 generates the shift gate signal Gs in which a state change occurs at half the blinking cycle of the light emitting portion 112. The image sensor 144, in synchronization with the state change of the shift gate signal Gs, alternately outputs the primary image data sequence X0 in the light-on state and the primary image data sequence X0 in the light-off state.

As a result, as shown in FIG. 4, the image processing portion 85 alternately obtains a light-on-time image data sequence Xon and a light-off-time image data sequence Xoff in synchronization with the shift gate signal Gs, wherein the light-on-time image data sequence Xon is the secondary image data sequence X1 when the light emitting portion 112 is in the light-on state, and the light-off-time image data sequence Xoff is the secondary image data sequence X1 when the light emitting portion 112 is in the light-off state.

In the example shown in FIG. 4, a new light-off-time image data sequence Xoff is obtained as the secondary image data sequence X1 at time points k, (k+2), (k+4), . . . , and in synchronization with it, the line buffer 852 outputs the light-on-time image data sequence Xon as the last but one secondary image data sequence X2. Similarly, a new light-on-time image data sequence Xon is obtained as the secondary image data sequence X1 at time points (k+1), (k+3), . . . , and in synchronization with it, the line buffer 852 outputs the light-off-time image data sequence Xoff as the last but one secondary image data sequence X2.

That is, when the latest secondary image data sequence X1 obtained by the image processing portion 85 is an image data sequence in the light-on state, the secondary image data sequence X2 output from the line buffer 852 is an image data sequence in the light-off state. Similarly, when the latest secondary image data sequence X1 obtained by the image processing portion 85 is an image data sequence in the light-off state, the secondary image data sequence X2 output from the line buffer 852 is an image data sequence in the light-on state.

Accordingly, each time a switch occurs between the light-on state and the light-off state, the subtraction portion 853 alternately generates: a result of subtracting the last but one secondary image data sequence X1 in the light-off state from the latest secondary image data sequence X1 in the light-on state; and a result of subtracting the last but one secondary image data sequence X1 in the light-on state from the latest secondary image data sequence X1 in the light-off state.

In FIG. 4, the result of subtracting the last but one secondary image data sequence X1 in the light-on state from the secondary image data sequence X1 in the light-off state is represented as a first subtraction data sequence Xoff-on. Similarly, the result of subtracting the last but one secondary image data sequence X1 in the light-off state from the latest secondary image data sequence X1 in the light-on state is represented as a second subtraction data sequence Xon-off. In the following description, of the two types of subtraction data sequences Y1 generated by the subtraction portion 853, the second subtraction data sequence Xon-off is referred to as a difference data sequence Ys.

It is noted that the line buffer 852, the subtraction portion 853, and the sampling portion 855 are an example of the difference data sequence generating portion. The difference data sequence generating portion sequentially obtains the secondary image data sequences X1 through the image scanning portion 11, and sequentially generates the difference data sequences Ys that are the results of subtracting the light-off-time image data sequence Xoff from the light-on-time image data sequence Xon that is obtained at each blinking cycle of the light emitting portion 112.

The data selecting portion 854 inputs two data sequences: the latest subtraction data sequence Y1; and the latest secondary image data sequence X1, selects one of the two data sequences in accordance with the operation mode signal Md output from the MPU 81, and outputs the selected data sequence.

When the operation mode signal Md indicates the open scanning mode, the data selecting portion 854 selects and outputs the subtraction data sequence Y1. On the other hand, when the operation mode signal Md indicates the closed scanning mode, the data selecting portion 854 selects and outputs the secondary image data sequence X1.

Furthermore, the timing adjusting portion 857 generates a sync signal Ss that synchronizes with the blinking cycle of the light emitting portion 112, and supplies the sync signal Ss to the sampling portion 855. The sampling portion 855 performs sampling of data in synchronization with the sync signal Ss. The timing adjusting portion 857 generates the sync signal Ss based on a light emission control signal Le that controls the blinking of the light emitting portion 112. The light emission control signal Le is output from the light emission control portion 84.

When the operation mode signal Md indicates the open scanning mode, the sampling portion 855 samples the difference data sequence Ys from the two types of subtraction data sequences Y1 that are sequentially calculated by the subtraction portion 853, in synchronization with the blinking cycle of the light emitting portion 112.

It is noted that when the operation mode signal Md indicates the closed scanning mode, the sampling portion 855 outputs the input secondary image data sequence X1 as it is, without sampling.

The post-processing portion 856 performs a predetermined adjustment process on the difference data sequence Ys or the input secondary image data sequence X1 output from the sampling portion 855, and generates a recording image data sequence Yd as a data sequence after the adjustment process. The recording image data sequence Yd generated by the post-processing portion 856 is used by the laser control portion 86 to adjust the amount of laser light output from the laser scanning portion 5.

More specifically, the post-processing portion 856 converts each pixel data in the difference data sequence Ys or the secondary image data sequence X1 that represents amounts of light emitted from the linear area, into data that represents pixel density. For example, the pixel data in the difference data sequence Ys or the secondary image data sequence X1 may be 256-gradation data having gradation values 0 to 255. In this case, the post-processing portion 856 calculates the pixel density of 256 gradation by subtracting each input pixel data from the maximum gradation value 255.

As described above, the laser control portion 86 adjusts the amount of the laser light output from the laser scanning portion 5, in correspondence with the density of each pixel indicated in the recording image data sequence Yd output from the image processing portion 85. With this configuration, in a case where the operation mode signal Md indicates the open scanning mode, the image forming device 2 forms, on the recording sheet 9, an image corresponding to the difference data sequences Ys that are sequentially generated by the image reading device 1. On the other hand, in a case where the operation mode signal Md indicates the closed scanning mode, the image forming device 2 forms, on the recording sheet 9, an image corresponding to the secondary image data sequences X1.

It is noted that in a case where the image reading device 1 has a function to read a color image, the image scanning portion 11 includes a plurality of image sensors 114 that detect respectively different colors. In this case, the image processing portion 85 includes a plurality of pre-processing portions 851, a plurality of line buffers 852, a plurality of subtraction portions 853, a plurality of sampling portions 855, and a plurality of post-processing portions 856 that respectively correspond to image data of different colors.

In addition, in a case where the image reading device 1 has a function to read a color image, the image forming device 2 may have a plurality of image forming portions 4 that respectively correspond to developer of different colors. In this case, each of the image forming portions 4 transfers an image to an intermediate transfer belt (not shown), and the image is transferred from the intermediate transfer belt to the recording sheet 9.

As described above, the light emission control portion 84 executes a light emission control process of causing the light emitting portion 112 to blink, wherein the light emitting portion 112 emits light toward the document sheet 90 placed on the document sheet table 13. In addition, the image scanning portion 11 executes an image scanning process of scanning the document sheet 90 along the sub scanning direction R2 while detecting, for each pixel, the amount of light emitted from the linear area extending along the main scanning direction R1, in both cases where the light emitting portion 112 is in the light-on state and the light-off state.

Furthermore, the image processing portion 85 executes an image data sequence obtaining process of sequentially obtaining the secondary image data sequences X1 each of which represents amounts of light detected with respect to pixels of the linear area, via the process executed by the image scanning portion 11. Furthermore, the image processing portion 85 executes a difference data sequence generating process of sequentially generating the difference data sequences Ys that are results of subtracting the light-off-time image data sequence Xoff from the light-on-time image data sequence Xon among the pair of light-on-time image data sequence Xon and light-off-time image data sequence Xoff obtained at each blinking cycle of the light emitting portion 112 during the image data sequence obtaining process.

[Specific Example of Result of Image Process]

Figure 5:
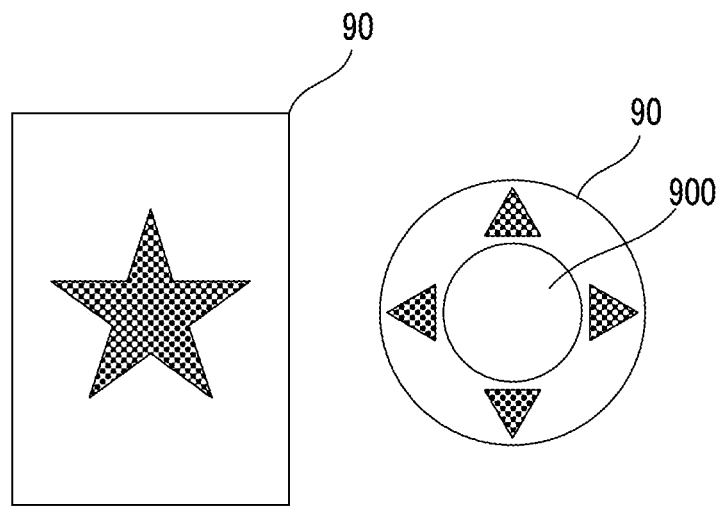
FIG. 5 is a diagram showing an example of a document sheet.
Figure 6:
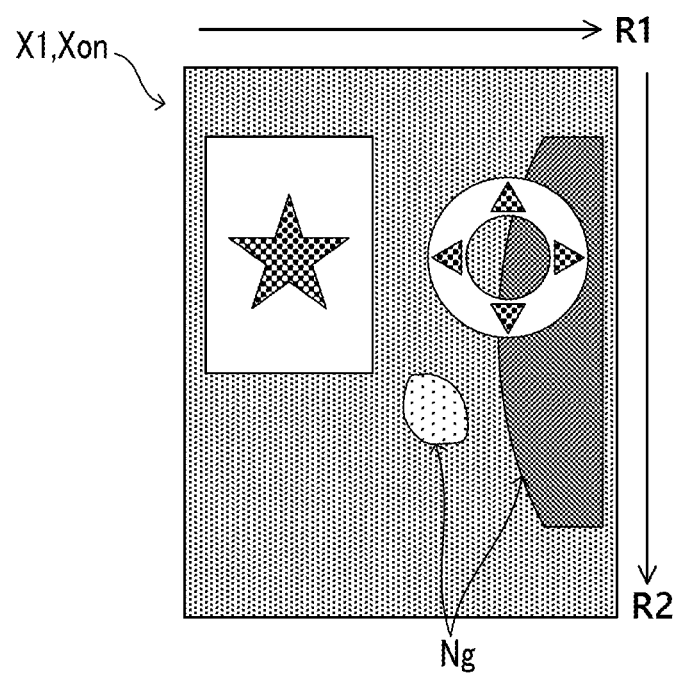
FIG. 6 is a diagram showing an example of a two-dimensional, composite image generated from image data sequences that are obtained when the light emitting portion is in a light-on state in the image processing apparatus according to the first embodiment of the present invention.
Figure 7:
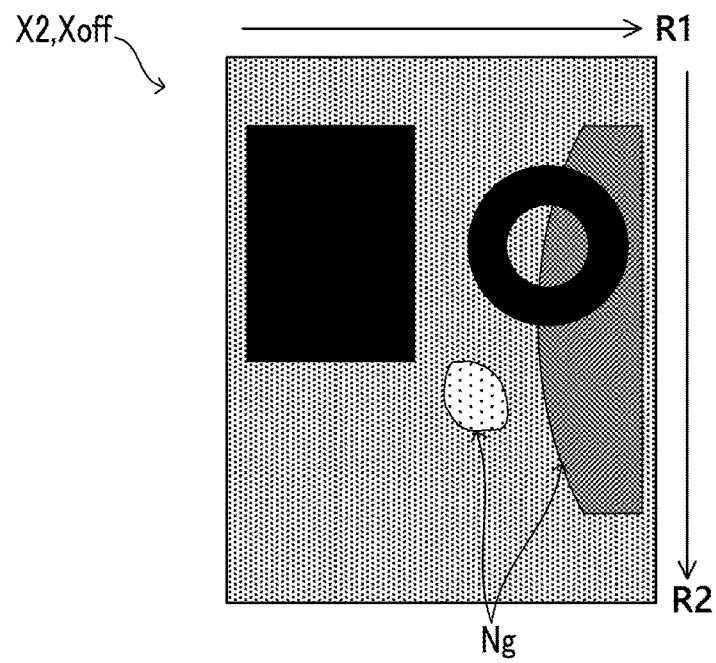
FIG. 7 is a diagram showing an example of a two-dimensional, composite image generated from image data sequences that are obtained when the light emitting portion is in a light-off state in the image processing apparatus according to the first embodiment of the present invention.
Figure 8:
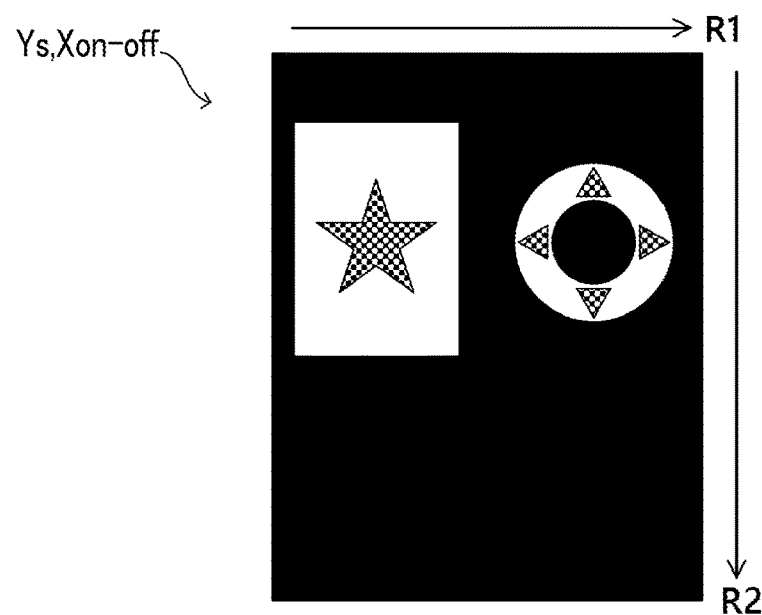
FIG. 8 is a diagram showing an example of a two-dimensional, composite image generated from difference data sequences that are obtained in the image processing apparatus according to the first embodiment of the present invention.

The following describes an example of a specific two-dimensional image that is obtained by an image process executed by the image processing apparatus 10, with reference to FIG. 5 to FIG. 8. FIG. 5 is a diagram showing an example of the document sheet 90. FIG. 6 to FIG. 8 show two-dimensional, composite images generated from data sequences that are obtained in the image processing apparatus 10 when the document sheet 90 on the document sheet table 13 is scanned in the open scanning mode in a state where the document sheet table cover 12 is opened.

FIG. 6 shows an example of a two-dimensional, composite image generated from the secondary image data sequences X1 that were obtained when the light emitting portion 112 was in a light-on state. FIG. 7 shows an example of a two-dimensional, composite image generated from the secondary image data sequences X1 that were obtained when the light emitting portion 112 was in a light-off state. FIG. 8 shows an example of a two-dimensional, composite image generated from the difference data sequences.

A case is considered where the two document sheets 90 shown in FIG. 5 are scanned in the open scanning mode in the image processing apparatus 10. In one of the two document sheets, an opening 900 is formed.

In a case where the two document sheets shown in FIG. 5 are scanned in the open scanning mode, a two-dimensional image, such as the image shown in FIG. 6, is obtained by combining the light-on-time image data sequences Xon along the sub scanning direction R2.

As shown in FIG. 6, the image of the light-on-time image data sequences Xon includes images of the two document sheets 90 and an image of the outside-document-sheet area. In addition, in the example shown in FIG. 6, the image of the outside-document-sheet area includes noise images Ng that include an image of external light and an image of a shadow of an object that blocks the external light.

On the other hand, as shown in FIG. 7, the image of the light-off-time image data sequences Xoff is includes images of shadows of the two document sheets 90 and an image of the outside-document-sheet area. In addition, as shown in FIG. 6 and FIG. 7, the images of the outside-document-sheet area in the light-on-time image data sequences Xon and the light-off-time image data sequences Xoff are approximately the same image.

FIG. 8 shows an example of an image formed based on the difference data sequences Ys that were obtained by subtracting the light-off-time image data sequences Xoff corresponding to FIG. 7 from the light-on-time image data sequences Xon corresponding to FIG. 6. As shown in FIG. 8, the image of the difference data sequences Ys includes images of the two document sheets 90 and an image of the outside-document-sheet area that is approximately uniform, wherein the noise images Ng have been removed from the image of the outside-document-sheet area.

The pixel data of the document sheet area in the difference data sequences Ys represents amounts of emitted light approximately in a range from an intermediate level to a maximum level. On the other hand, the pixel data of the outside-document-sheet area in the difference data sequences Ys represents approximately a minimum amount of emitted light, namely, a maximum density.

In addition, the image processing portion 85 derives the difference data sequence Ys from which noise images Ng have been removed, by an extremely simple process of subtracting the latest secondary image data sequence X1 and the last but one secondary image data sequence X2. During that process, the image processing portion 85 does not need to perform, for each linear area, an image process, such as an edge detection process, having a relatively high calculation load for identifying the document sheet area from image density data.

Accordingly, when the image processing apparatus 10 is adopted in a case where the document sheet 90 is scanned while the document sheet table cover 12 is opened, it is possible to avoid a phenomenon where noise images Ng appear in the outside-document-sheet area due to external light.

Furthermore, the line buffer 852, the subtraction portion 853, the sampling portion 855 and the like can be implemented by elements of small power consumption and low price.

Second Embodiment

Figure 9:
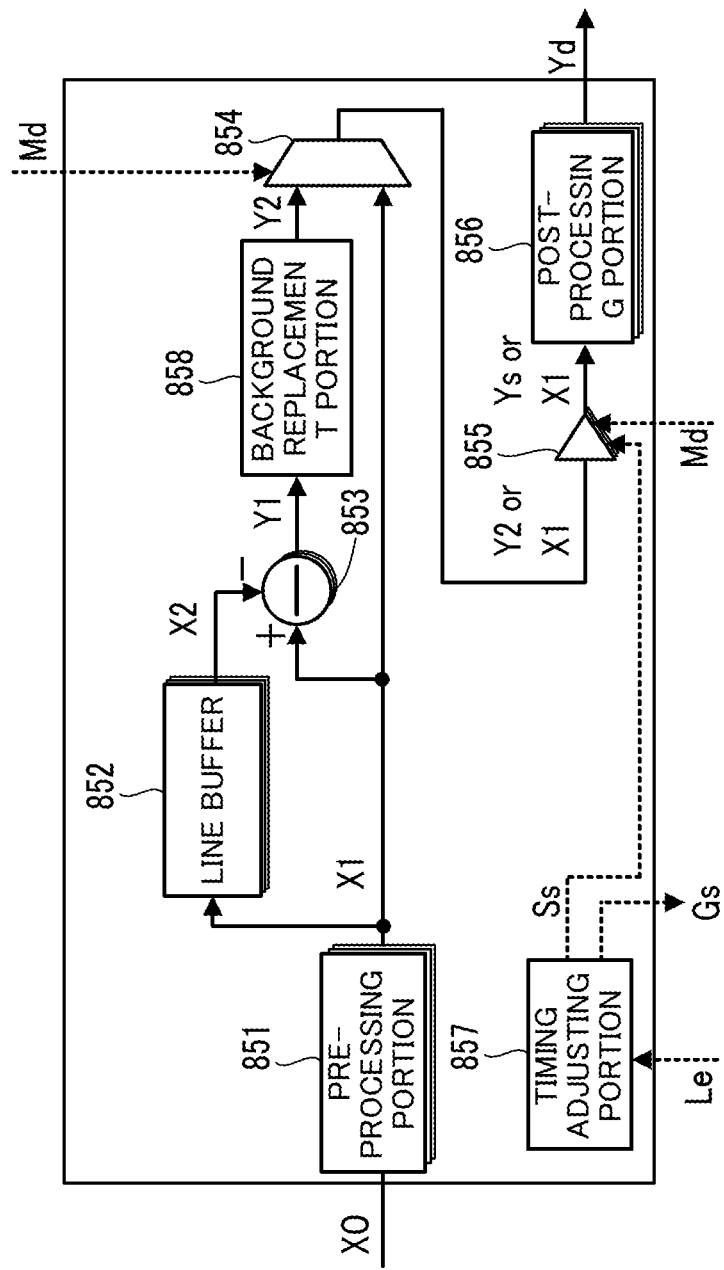
FIG. 9 is a block diagram of an image processing portion included in an image processing apparatus according to a second embodiment of the present invention.

Next, a description is given of an image processing portion 85A included in an image forming apparatus according to a second embodiment of the present invention, with reference to FIG. 9. The image processing portion 85A is an application example of the image processing portion 85 of the image processing apparatus 10.

FIG. 9 is a block diagram of the image processing portion 85A. In FIG. 9, components that are the same as those shown in FIG. 3 are assigned the same reference signs. The following describes differences of the image processing portion 85A from the image processing portion 85.

The image processing portion 85A includes a background replacement portion 858 in addition to the configuration of the image processing portion 85. The background replacement portion 858 executes a background replacement process of replacing data in the difference data sequences Ys generated by the subtraction portion 853 that satisfies a predetermined replacement condition, with a piece of background data that has been set in advance. The replacement condition includes a condition that a pixel value is lower than a lower limit value that has been set in advance. It is noted that the pixel value is a value of each of pixels included in the difference data sequence Ys.

In addition, in the image processing portion 85A, the data selecting portion 854 inputs two data sequences: the latest subtraction data sequence Y1; and the latest secondary image data sequence X1, selects one of the two data sequences in accordance with the operation mode signal Md, and outputs the selected data sequence.

Furthermore, in the image processing portion 85A, when the operation mode signal Md indicates the open scanning mode, the sampling portion 855, in synchronization with the blinking cycle of the light emitting portion 112, samples the difference data sequence Ys from the two types of subtraction data sequences Y1 that are sequentially calculated by the subtraction portion 853.

As described above with reference to the example of FIG. 8, the pixel data of the document sheet area in the difference data sequences Ys corresponds to amounts of emitted light approximately in a range from an intermediate level to a maximum level. On the other hand, the pixel data of the outside-document-sheet area in the difference data sequences Ys approximately corresponds to a minimum amount of emitted light.

Accordingly, by setting the lower limit value of the replacement condition to a value of a level that is close to the minimum amount of emitted light, it is possible to replace the pixel data of the outside-document-sheet area with arbitrary uniform data. For example, the pixel data of the outside-document-sheet area may be replaced with data that is output as an image of white or another arbitrary gradation during a formation of an image.

In addition, the MPU 81 may set the background data in accordance with a user operation performed on the operation/display portion 80, by executing a background data setting program Pr3.

It is noted that the image processing portion 85A may include a plurality of pre-processing portions 851, a plurality of line buffers 852, a plurality of subtraction portions 853, a plurality of sampling portions 855, and a plurality of post-processing portions 856 that respectively correspond to image data of different colors. In this case, the background replacement portion 858 executes the background replacement process with respect to the difference data sequences Ys of different colors. In this case, background data of the same gradation or background data of different gradations may be set with respect to the difference data sequences Ys of the different colors.

In addition, the replacement condition may be that the pixel value is lower than the lower limit value, and a predetermined number or more of pixel values including the pixel that are lower than the lower limit value continue in the main scanning direction R1. In general, a plurality of pieces of pixel data of extremely small values often continue in the outside-document-sheet area. As a result, by setting that the replacement condition includes a condition that a plurality of pieces of pixel data that are lower than the lower limit value continue, it is possible to prevent the background replacement portion 858 from replacing the pixel data in the document sheet area with the background data.

APPLICATION EXAMPLES

In the image processing portions 85 and 85A described above, when the operation mode signal Md indicates the open scanning mode, the scanning speed of the image scanning portion 11 in the sub scanning direction R2, namely, the moving speed of the moving unit 111, may be set to a lower speed than when the operation mode signal Md indicates the closed scanning mode. This makes it possible to avoid the image resolution by the image scanning portion 11 in the open scanning mode in the sub scanning direction R2 from reducing to half the image resolution in the closed scanning mode.

It is noted that when the operation mode signal Md is in a state of indicating the open scanning mode, the light emitting portion 112 is in an operation state of blinking while the image scanning portion 11 is scanning. On the other hand, when the operation mode signal Md is in a state of indicating the closed scanning mode, the light emitting portion 112 is in an operation state of keeping lighting while the image scanning portion 11 is scanning.

In addition, in the image processing portions 85 and 85A, the cycle of the image scanning portion 11 detecting the light amount of the linear area in the sub scanning direction R2, namely, the cycle of the light emission control signal Le, may be set to be shorter when the operation mode signal Md indicates the open scanning mode, than when it indicates the closed scanning mode. This makes it possible to avoid the image resolution by the image scanning portion 11 in the open scanning mode in the sub scanning direction R2 from reducing to half the image resolution in the closed scanning mode. Furthermore, this makes it possible to avoid the scanning time of the image scanning portion 11 from becoming long.

In addition, the processes of the image processing portions 85 and 85A may be implemented by a processor that executes a computer program. For example, the MPU 81 or another MPU for image processing may perform processes that are equivalent to the processes of the image processing portions 85 and 85A by executing a program that has been stored in advance in the storage portion 82.

It is noted that the image reading device, the image processing apparatus, and the image reading method of the present invention may be configured by freely combining, within the scope of claims, the above-described embodiments and application examples, or by modifying the embodiments and application examples or omitting a part thereof.

The invention claimed is:

1. An image reading device comprising:
a light emission control portion configured to cause a light emitting portion to blink, the light emitting portion emitting light toward a document sheet placed on a transparent document sheet table;
an image scanning portion configured to, both when the light emitting portion is in a light-on state and when the light emitting portion is in a light-off state, scan the document sheet along a sub scanning direction while detecting, for each pixel, an amount of light emitted from a linear area of a document sheet table that extends along a main scanning direction, the sub scanning direction being perpendicular to the main scanning direction; and a difference data sequence generating portion configured to sequentially obtain, through the image scanning portion, image data sequences each of which represents amounts of light detected with respect to pixels of the linear area, and sequentially generate difference data sequences that are results of subtracting a light-off-time image data sequence from a light-on-time image data sequence among a pair of image data sequences obtained at each blinking cycle of the light emitting portion, wherein the difference data sequence generating portion includes:
- a line buffer configured to, when image data sequences of the linear area are sequentially obtained through the image scanning portion, temporarily store an image data sequence until a next image data sequence is obtained;
- a subtraction portion configured to sequentially generate subtraction data sequences each of which is a result of subtracting a predetermined one of a latest secondary image data sequence and a last but one secondary image data sequence, from the other, wherein the latest secondary image data sequence is obtained through the image scanning portion, and the last but one secondary image data sequence is stored in the line buffer; and
- a sampling portion configured to sample the difference data sequences from the subtraction data sequences that are sequentially generated by the subtraction portion, in synchronization with the blinking cycle of the light emitting portion.

2. The image reading device according to claim 1, further comprising:
a background replacement portion configured to replace data in the difference data sequences that satisfies a replacement condition, with a piece of background data, the replacement condition including a condition that a pixel value is lower than a lower limit value that has been set in advance.

3. The image reading device according to claim 2, wherein
the replacement condition further includes a condition that a predetermined number or more of pixel values that are lower than the lower limit value continue in the main scanning direction.

4. An image processing apparatus comprising:

the image reading device according to claim 1; and an image forming device configured to form an image on a recording sheet based on the difference data sequences sequentially generated by the image reading device.

5. An image reading method comprising:

a step of causing a light emitting portion to blink, the light emitting portion emitting light toward a document sheet placed on a transparent document sheet table;

a step of, both when the light emitting portion is in a light-on state and when the light emitting portion is in a light-off state, scanning the document sheet along a sub scanning direction while detecting, for each pixel, an amount of light emitted from a linear area of a document sheet table that extends along a main scanning direction, the sub scanning direction being perpendicular to the main scanning direction; and a step of sequentially obtaining, through the step of scanning the document sheet, image data sequences each of which represents amounts of light detected with respect to pixels of the linear area, and sequentially generating difference data sequences that are results of subtracting a light-off-time image data sequence from a light-on-time image data sequence among a pair of image data sequences obtained at each blinking cycle of the light emitting portion, wherein the step of generating the difference data sequences includes
- a step of temporarily storing an image data sequence in a line buffer when image data sequences of the linear area are sequentially obtained, until a next image data sequence is obtained,
- a step of sequentially generating subtraction data sequences each of which is a result of subtracting a predetermined one of a latest secondary image data sequence and a last but one secondary image data sequence, from the other, wherein the latest secondary image data sequence is obtained through the step of scanning the document sheet, and the last but one secondary image data sequence is stored in the line buffer, and
- a step of sampling the difference data sequences from the subtraction data sequences that are sequentially generated in synchronization with the blinking cycle of the light emitting portion.

* * * * *